(No Model.)
D. M. MILLER.
CAR AXLE.
No. 475,965. Patented May 31, 1892.
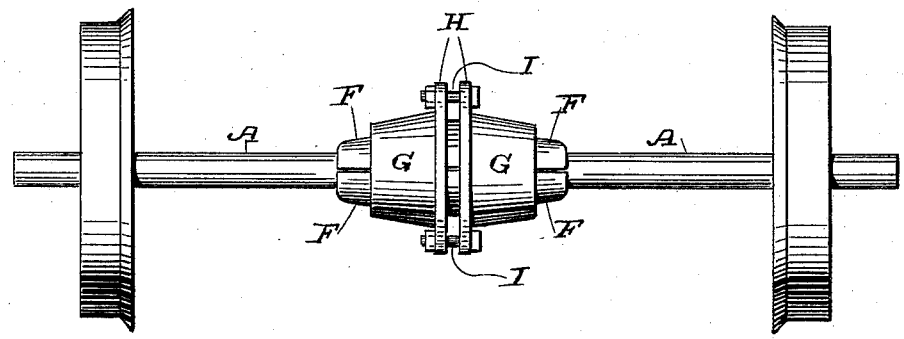
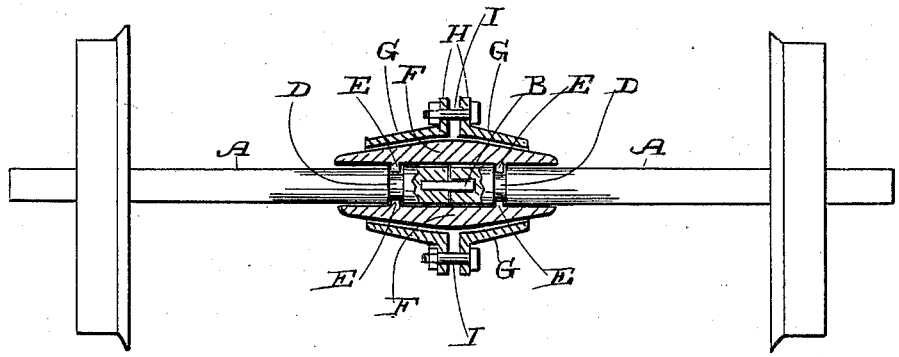
Witnesses,
Inventor,
David M. Miller
By Dewey & Co.
Attys

UNITED STATES PATENT OFFICE.

DAVID M. MILLER, OF FAIRFIELD, CALIFORNIA.

CAR-AXLE.

SPECIFICATION forming part of Letters Patent No. 475,965, dated May 31, 1892.

Application filed February 2, 1892. Serial No. 420,103. (No model.)

*To all whom it may concern:*

Be it known that I, DAVID M. MILLER, a citizen of the United States, residing at Fairfield, Solano county, State of California, have invented an Improvement in Car-Axles; and I hereby declare the following to be a full, clear, and exact description of the same.

My invention relates to certain improvements in car-axles.

It consists in dividing the axle near the center and in a peculiar sleeve and coupling by which the two parts are held together and allowed to rotate independently of each other.

Referring to the accompanying drawings for a more complete explanation of my invention, Figure 1 is an exterior view of my coupling. Fig. 2 is a section of the same.

A A are the two parts of an axle, which is divided in the center. These parts have holes bored in the ends for a short distance, and a corresponding pin B is adapted to enter the holes, so as to hold the two parts of the axle exactly in line while allowing them to turn freely.

Around each part of the axle, near these meeting ends, is turned a groove or channel D, for the purpose of receiving the collars E of the sleeve F. This sleeve is split longitudinally into two parts, so as to facilitate fitting it upon or taking it off the axle. It is made of considerable length in the form of a double cone, having the greatest thickness and strength at the center. It is bored out so as to exactly fit the axle and is provided with the collars E, as before described, to fit the grooves D, made around the axle near the meeting ends. When the two parts of the sleeve have been applied to the axle, they are retained in place by the hollow conical collars G, which are fitted to surround the two halves of the inner sleeves and clamp them closely together upon the axle. The outer collars G have flanges H, through which holes are made for the introduction of bolts I, and by the aid of these bolts the two collars are drawn toward each other, their inner surfaces fitting over the outer conical surfaces of the inner cones, and thus clamping them strongly together and upon the axle, at the same time giving great strength to this central divided portion of the axle, while allowing the two parts to turn freely with reference to each other, the object being to allow either of the wheels which are fixed to the opposite ends of the axle to turn independent of the other, as when passing around curves.

The double cone-shaped sleeve with the inclosing conical clamping-collars and the pin-and-socket connection of the abutting ends of the axle form a powerful supporting-truss, which overcomes any objection of lack of strength in the structure.

Having thus described my invention, what I claim as new, and desire to secure by Letters Patent, is—

1. The two-part axle having abutting ends with holes bored centrally in them and a guide-pin projecting into the holes, a two-part sleeve surrounding the meeting ends of the shafts, having inwardly-projecting collars, grooves formed in the axles, into which said collars fit, and the exterior collars by which the sleeves are clamped together and retained upon the axle, substantially as herein described.

2. A two-part axle with abutting ends, an axial pin-and-socket connection between the ends, by which a movable connection is made between the two, circumferential grooves around the adjacent meeting ends of the axles, a longitudinally-divided sleeve, the exterior of which forms a double cone and the interior is formed to fit the axle, and having interior collars which fit the annular grooves of the axle, exterior conical collars fitting the conical surfaces of the sleeves, with flanges upon their inner ends, and bolts by which these flanges are drawn toward each other, substantially as herein described.

In testimony whereof I have hereunto set my hand.

DAVID M. MILLER.

Witnesses:
J. W. ANDERSON,
JOHN MARSHALL.